United States Patent [19]

Vander Meer et al.

[11] Patent Number: 4,934,508

[45] Date of Patent: Jun. 19, 1990

[54] APPARATUS AND METHOD FOR PROMOTION OF PRESELECTED ARTICLE ORIENTATION IN AN ASSEMBLAGE OF ARTICLES

[75] Inventors: Richard H. Vander Meer, Arvada; Milton W. Kapke, Golden, both of Colo.

[73] Assignee: Goldco Industries, Inc., Loveland, Colo.

[21] Appl. No.: 333,858

[22] Filed: Apr. 4, 1989

Related U.S. Application Data

[63] Continuation of Ser. No. 72,795, Jul. 13, 1987, abandoned.

[51] Int. Cl.$^5$ .............................................. B65G 47/26
[52] U.S. Cl. ................................... 198/434; 414/791.7
[58] Field of Search .............. 198/425, 434, 454, 462; 414/791.7, 789.2

[56] References Cited

U.S. PATENT DOCUMENTS

| | | | |
|---|---|---|---|
| 2,571,790 | 10/1951 | Tomkins | 198/434 X |
| 2,858,009 | 10/1958 | Bainbridge | 198/434 X |
| 3,109,531 | 11/1963 | Jackson | 198/434 |
| 3,172,547 | 3/1965 | Holstebroe | 414/59 |
| 3,219,203 | 11/1965 | Jeremiah | 414/59 X |
| 3,645,410 | 2/1972 | Powell | 414/59 |
| 3,659,726 | 5/1972 | Anderson | 414/59 |
| 3,680,678 | 8/1972 | Ganz | 198/434 X |
| 3,937,336 | 2/1976 | Carlson | 414/59 X |
| 3,990,566 | 11/1976 | Nordquist | 414/59 X |
| 4,190,146 | 2/1980 | Knuchel | 198/461 X |
| 4,236,625 | 12/1980 | Smith et al. | 198/454 |
| 4,603,896 | 8/1986 | Vasseur et al. | 414/59 X |
| 4,667,808 | 5/1987 | Mastak | 414/59 X |

FOREIGN PATENT DOCUMENTS

108617 6/1984 Japan.

*Primary Examiner*—Robert J. Spar
*Assistant Examiner*—D. Glenn Dayoan
*Attorney, Agent, or Firm*—Robert E. Harris

[57] ABSTRACT

An apparatus and method are disclosed for promoting preselected article orientation by elimination of unoccupied spaces in an assemblage of articles at a staging area, and, more particularly for precisely grouping cans prior to palletization thereof. The apparatus has opposite side walls, at least one of which is movable relative to the other, adjacent to a transfer surface for alternately expanding and contracting the area allotted to article staging, while the articles are being assembled to thereby cause articles to occupy unoccupied spaces and thereby enhance quantity reliability of articles within a given area.

24 Claims, 6 Drawing Sheets

Fig-1

Fig_2

Fig_3

Fig.-4

Fig_5

Fig_6

Fig_7

Fig_8

APPARATUS AND METHOD FOR PROMOTION OF PRESELECTED ARTICLE ORIENTATION IN AN ASSEMBLAGE OF ARTICLES

This application is a continuation of pending application Ser. No. 07/072,795, filed July 13, 1987 now abandoned.

FIELD OF THE INVENTION

This invention relates to an apparatus and method for formation of articles into an assemblage, and, more particularly, relates to an apparatus and method for elimination of unoccupied spaces in an assemblage of articles being gathered at a collection area on a moving transfer surface to thereby promote preselected article orientation in the assemblage of articles.

BACKGROUND OF THE INVENTION

Apparatus and/or processes for formation of articles on a transfer surface into a palletizable assemblage of articles have been heretofore suggested and/or utilized. It is known, however, that as such articles are being gathered, for example by inclusion at a collection area of a barrier for impeding the movement of such articles on a moving transfer surface, unoccupied spaces, or voids, may be left in the assemblage thereby resulting in an unreliable count of the articles when palletized for shipment.

For example, it is now known that such unoccupied areas are common when accumulating cylindrical articles, such as cans, at a palletizing area including a conveyor and a selectively positionable barrier for halting movement of the cylindrical articles on the conveyor, and that such unoccupied spaces have been filled by manual manipulation of the articles. Devices have also been suggested and/or utilized wherein a rail is positioned adjacent a conveyor, with the rail being moved outwardly of the accumulated assemblage for a period of time. Such a device has been shown not to be entirely effective in causing unoccupied spaces to be occupied, however, and particularly where the unoccupied spaces are toward the middle of the accumulation, the one time, outwardly movement of the rail, not being entirely effective in shifting of the entire pattern of accumulated articles. Improvements in such devices and/or processes are, therefore, deemed to be still useful and/or needed.

SUMMARY OF THE INVENTION

This invention provides an improved apparatus and method for promoting preselected article orientation by elimination of unoccupied spaces, or voids, in an assemblage of articles at a staging area, for example while being gathered at a staging area. Varying pressures are repeatedly exerted against surfaces of the articles while the articles are being assembled to thereby cause movement of articles in a manner such that unoccupied spaces between articles become occupied and a preselected article orientation in the assemblage is promoted.

It is therefore an object of this invention to provide an apparatus and method for promoting preselected article orientation in an assemblage of articles.

It is another object of this invention to provide an apparatus and method for promoting preselected article orientation in an assemblage of articles which causes occupation of unoccupied spaces in the assemblage of articles.

It is another object of this invention to provide an apparatus and method for promoting preselected article orientation by utilizing repeated varying pressures against surfaces of the articles to cause movement thereof in a manner such that unoccupied spaces between articles become occupied.

It is still another object of this invention to provide an apparatus and method for promoting occupation of unoccupied spaces in an assemblage of articles being gathered for palletization which is usable in association with a system for palletizing articles so that an accurate count of such palletized articles is obtained for shipment thereof.

It is yet another object of this invention to provide an apparatus for promoting occupation of unoccupied spaces in an assemblage of cylindrical articles which includes a moving transfer surface having side walls adjacent thereto defining a collection area, with the side walls being movable to repeatedly alter at least one dimension of the collection area.

It is still another object of this invention to provide a system for formation of cylindrical articles into a palletizable assemblage having a transfer surface, a selectively positionable barrier for impeding movement of the articles when in a first position and for allowing movement of the assemblage when in a second position, and side walls adjacent opposite sides of the transfer surface and connected to means for moving the side walls reciprocally to provide a repeatedly, alternately expandable and contractible collection area for the cylindrical articles being assembled.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
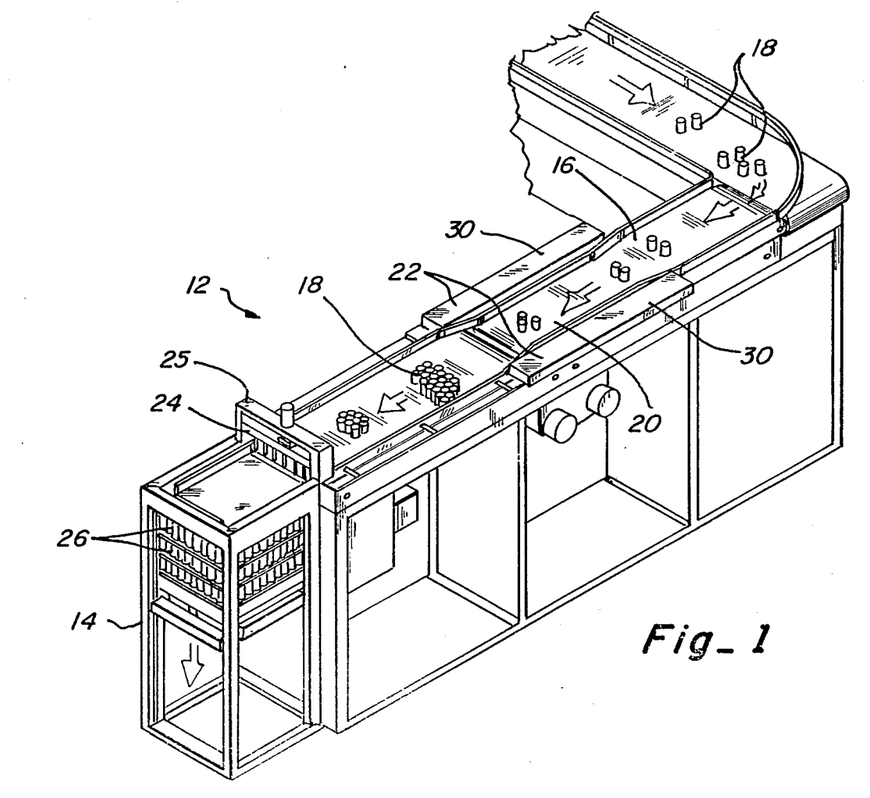
FIG. 1 is a perspective view of a system for formation of articles into an assemblage including the apparatus for promotion of preselected article orientation.

A system 12 for formation of articles into a palletizable assemblage is shown in FIG. 1. The system includes elevator 14 for stacking of palletized articles, and transfer surface 16, which may be provided, for example, by the upper surface or surfaces of one or more conventional endless belt conveyors, for transporting articles 18, herein beverage cans, through staging area 20. System 12 also includes apparatus 22 for promoting predetermined orientation of articles in an assemblage, and selectively positionable barrier 24 for impeding movement of articles on transfer surface 16 when in the down position and for allowing passage therethrough of an assemblage of articles 26, when in the up position, for palletization of the assemblage at elevator 14.

Apparatus 22, as shown in FIG. 1, is covered by protective safety guards 30 for protecting a user of the system, his garments or tools, from becoming entangled in apparatus 22 during operation of the system.

While a system for palletization of articles is shown in FIG. 1, it is to be realized that apparatus 22 could be employed in any transfer system where a predetermined, compact, orientation of articles is desired (wherein unoccupied spaces, or voids, in the assemblage of articles is not desired).

Figure 2:
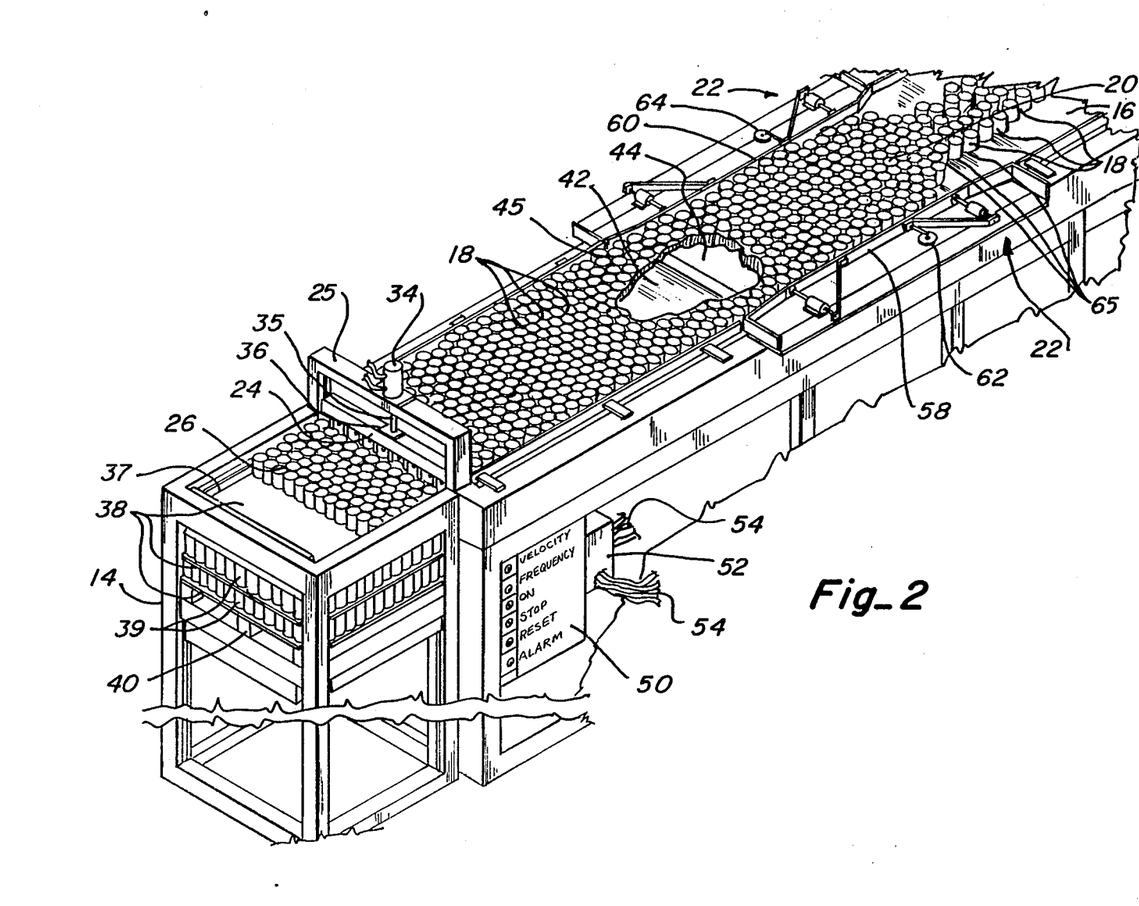
FIG. 2 is a perspective view of the system of FIG. 1 and particularly illustrating the apparatus for promotion of preselected article orientation in the assemblage of articles with the safety guards removed therefrom.

FIG. 2 illustrates in greater detail apparatus 22 in association with barrier 24. Barrier 24 is selectively raised and lowered by positive air pressure cylinder 34 moving shaft 35 axially in reciprocating directions. Shaft 35 is connected to barrier 24 in a conventional manner, for example by connection of the shaft at mounting plate 36 welded to barrier 24. Barrier 24 is movably housed in housing 25 (for example, by slideably mounting the barrier in vertical channels along the sides of the housing for upward and downward movement of the barrier therein). The cylinder position is controlled by appropriate valving connected with an in-house air supply. When in the up position, as shown in FIG. 2, an assemblage of articles 26 is allowed to move on transfer surface 16 to palletizing area 37 of elevator 14, herein a divider sheet 38 for dividing layers of palletized articles 39 in elevator 14, the bottom layer being positioned on pallet 40 (as shown in FIG. 1).

When an assemblage of articles 26 is in place on divider sheet 38, barrier 24 is lowered thereby impeding the movement of articles 18 on transfer surface 16 (transfer surface 16 being a substantially continually moving surface), and elevator 14 lowers the layers for positioning of another sheet 38 over the most recently lowered layer of articles in preparation for raising of barrier 24 for palletization of another assemblage of properly oriented articles.

Figure 3:
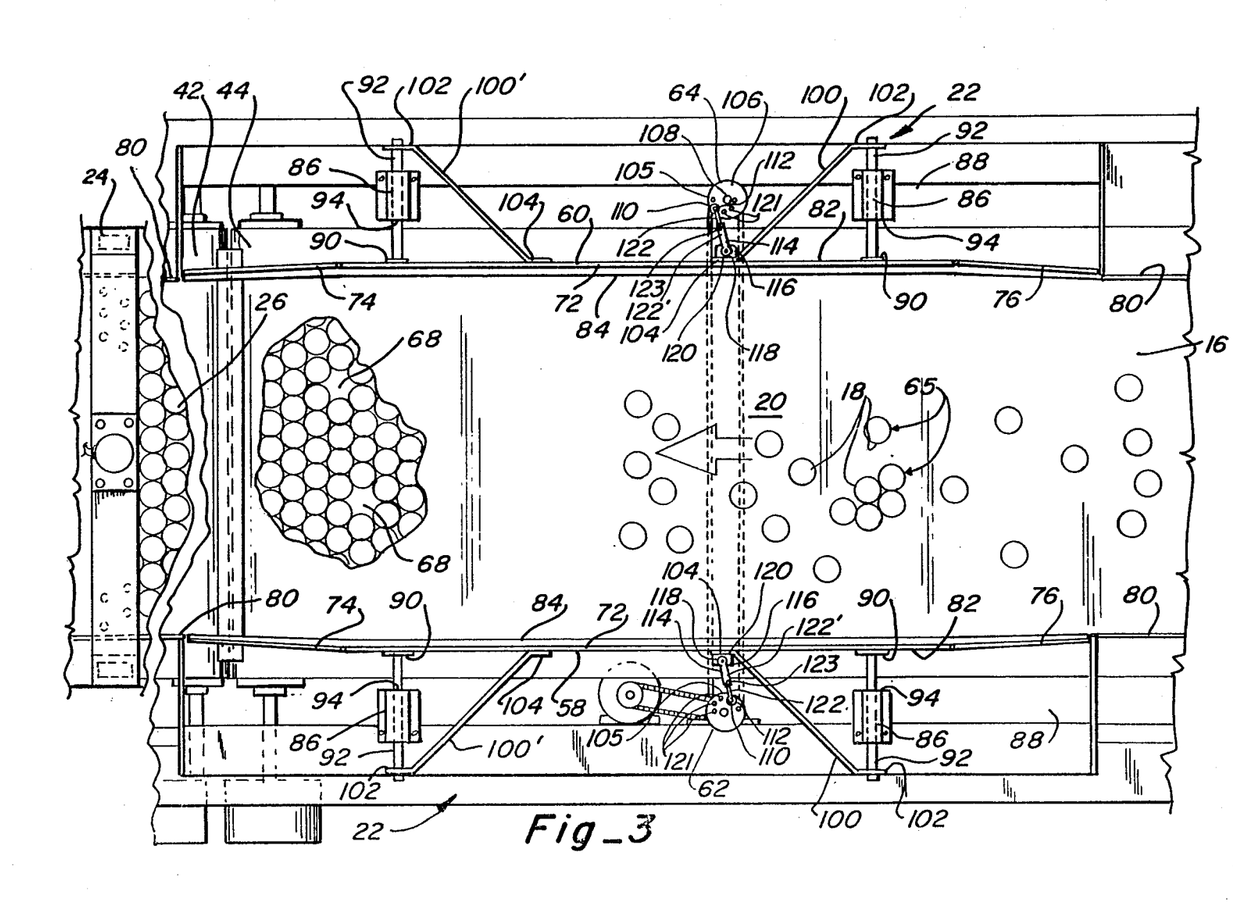
FIG. 3 is a top view of the apparatus of FIG. 2.
Figure 4:
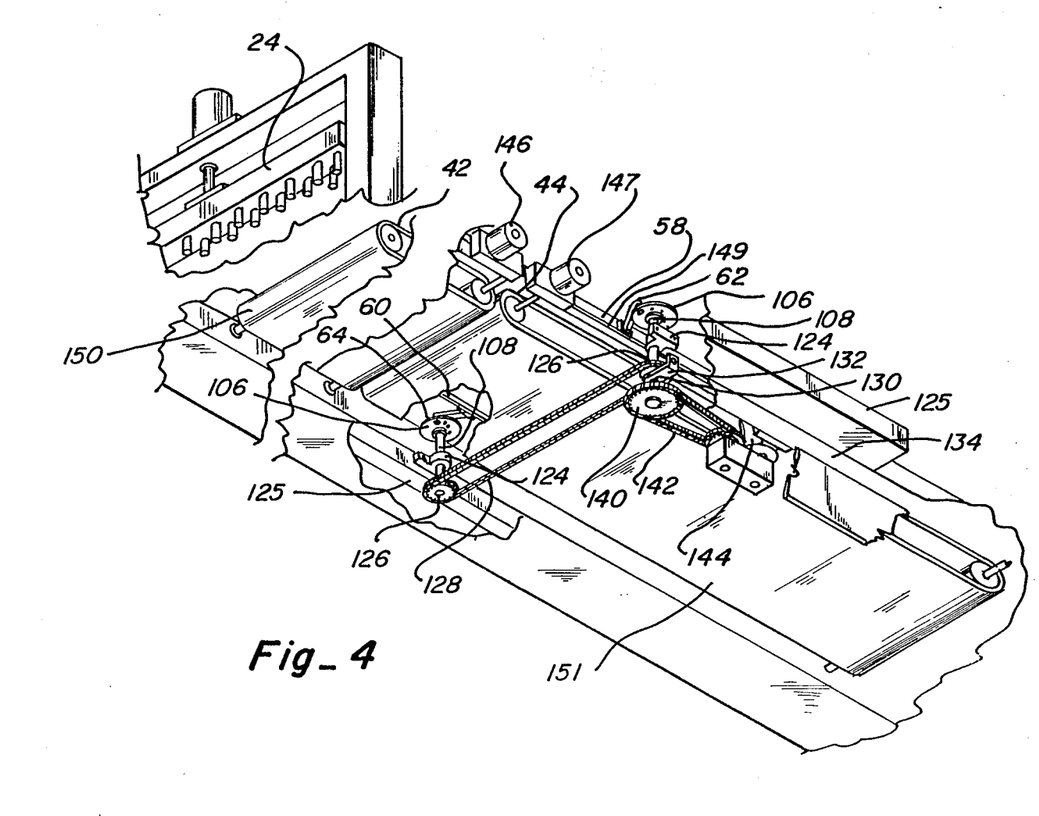
FIG. 4 is a bottom perspective view of the apparatus particularly illustrating a drive mechanism therefor.

For high speed palletization applications or other high speed operations, overall transfer surface 16 is preferably divided into a downstream, or forward, transfer surface 42 and an upstream, or rearward, transfer surface 44 at least partially at staging, or collection, area 20 (as shown in FIGS. 2 through 4), with each transfer surface having separate drive means for driving the transfer surfaces (the top surfaces of two endless belt conveyors placed end to end for example) at different rates preferably from a one-to-one to a two-to-one ratio. For example, for use with standard size beverage cans, transfer surface 42 preferably operates at a rate of 96 feet per minute, and transfer surface 44 at a rate of 140 feet per minute, to accommodate a controlled, further impeded, flow of articles through the system. The transfer surfaces may be divided at any convenient location, preferably at or near the downstream end 45 (in the direction to flow of articles) of staging area 20. When operating at low speeds, a single transfer surface, or surfaces operating at the same speed, only is required.

Control mechanism 50 is provided for operational control of the system and includes programmable and/or manual operational controls such as emergency stop and start, alarm, and the programming and switching controls required for sequential orchestration of operational events. Valving mechanism 52, having positive air pressure supply lines 54 thereto, is provided for control of the pneumatic cylinders in the system, for example cylinder 34 at variably positionable barrier 24.

Apparatus 22, as shown in FIG. 2, includes opposite side walls 58 and 60 adjacent transfer surface 44, and reciprocating mechanisms 62 and 64 for controlling reciprocal motion in a direction toward and away from each other imparted to opposite side walls 58 and 60 by mechanisms 62 and 64. As more fully set forth hereinafter, the opposite side walls exert pressure on the articles at the staging area, the pressure being variably applied by reciprocating mechanisms 62 and 64.

Turning now to FIG. 3 where apparatus 22 is shown in more detail, with barrier 24 in a down position, movement of articles 18 through staging area 20 is impeded to thereby begin gathering of articles 18 into an assemblage 26. Staging, or collection, area 20 is the area over a portion of transfer surface 44 and/or 42 providing a pathway between walls 58 and 60, and is positioned, preferably, at least partially rearward (in the direction of flow) of transfer surface 42. Articles 18 are transferred to staging area 20 in an upright position on transfer surface 44 with the bottom surface 65 of articles 18 being contiguous to the transfer surface (thereby providing an orientational reference).

As article 18 begin to gather at staging area 20, unoccupied spaces, or voids, 68 typically begin to appear as the articles begin to accumulate at the staging area. Such voids in the patterned assemblage of articles are undesirable when, for example, an accurate count of palletized articles is desired for shipment to an end user of the articles, such unoccupied spaces frequently resulting in under shipment. In order to cause occupation of such unoccupied spaces in the accumulating articles, walls 58 and 60 are constructed so as to be movable along substantially the entire length thereof, having a reciprocal movement imparted thereto by mechanisms 62 and 64, the result of such movement being first an expansion of staging area 20 along the dimension extending at an angle to the direction of movement of overall transfer surface 16, followed by contraction of the staging area along the same dimension as the walls 58 and 60 return to their original position, this reciprocal motion being repeated continually at least during accumulation of articles 18 at staging area 20.

The extent of movement of the walls is variable, as more fully set forth hereinafter, and dependent on the diameter of the articles being accumulated at staging area 20 (for example, when used with a standard beverage can having a diameter of approximately 2 9/16 inches, the preferable expansion of the staging area is 1¼ inches, representing movement of approximately 1⅛ inches by each wall in a direction away from each other). The amount of wall movement typically is limited to an extent that allows can patterns, for example, to become less compactly arranged while maintaining the essential assemblage pattern in tact to thereby allow articles to move forward to fill unoccupied spaces.

Opposite side walls 58 and 60, as shown in FIG. 3, are of three-piece construction, having a center portion 72 and outer portions 74 and 76. The portions are held in a pivotable relationship with respect to one another in a conventional fashion as by, for example, hinges, web connections, or the like. In turn, the end portions 74 and 76 of side walls 58 and 60 are connected at side rails 80 adjacent transfer surface 16 in a flexible fashion (again as by, for example, hinges, webbings, or the like).

Side walls 58 and 60 may be variously configured and are shown in FIG. 3 as channeled members 82, with the channeled members being preferably provided for receipt of padded article contact surfaces 84 secured in the channel by conventional means, for example by gluing, fastening, or press fitting. The padded sections assure that articles 18 are not damaged during reciprocal movement of the walls 58 and 60.

As the description proceeds (with reference to FIGS. 3 and 4) only one or the other of walls 58 or 60, and their respective drive systems and mountings, may be clearly detailed by the drawings, it being understood that each wall is mounted and driven in a substantially identical manner except as may otherwise be specifically set forth hereinbelow. Walls 58 and 60 are mounted adjacent the transfer surface on mounting blocks 86 attached by bolts to frame members 88. Walls 58 and 60 have attachment plates 90 (preferably two spaced at opposite ends of each wall) affixed to the upper portions thereof as, for example, by welding or the like, and guide rods 92 are fastened at one end thereof through apertures in plates 90, for example using retaining clips. Guide rods 92 extend through an opening 94 in guide blocks 86 and are slideably movable therethrough.

Guide rods 92 are affixed to angular support plates 100 and 100' at attachment ears 102 thereof at the opposite end of the rods passing through guide blocks 86 (for example, through apertures in ears 102 using retaining clips), with second ears 104 of support plates 100 and 100' being affixed to movable side walls 58 and 60, for example by welding, at the connection between the side walls and reciprocating mechanisms 62 and 64, at ears 104 of support plates 100, and to side walls 58 and 60 by ears 104 of support plates 100' inward of the remaining guide blocks 86.

Reciprocating mechanisms 62 and 64, as shown in both FIGS. 3 and 4, include rotating eccentrics 105, which include wheel portions 106 mounted to shafts 108 (for example by retaining rings or the like) at the center of wheels 106. Offset from the center of wheels 106 are connecting pins 110 firmly affixed, as for example by bolting, welding or the like, to wheels 106 with connecting pins 110 pivotably receiving eyes 112 of eccentrically mounted linkage rods 114, the other end of linkage rods 114 being pivotably connected at eyes 116 to pins 118 attached to appendages 120 of ears 103. Wheels 106 may be provided with a plurality of mounting holes 121, and rods 114 may be two piece, extendable rods having rod portion 122 adjustably mounted in rod portion 122' and provided with set screw 123 for securing the rod portions, to thereby allow for adjustment of the magnitude of reciprocal motion of walls 58 and 60 to accommodate articles of varying sizes while maintaining proper alignment of walls 58 and 60 with side rails 80 when walls 58 and 60 are nearest one another in their respective reciprocal movements.

Shafts 108 are received through bearing mounting blocks 124 attached to frame members 125 in a conventional manner (for example by bolting the bearing housing to the frame member), and through gears 126, a toothed gear for driving chain 128 between the gears 126 of reciprocating mechanisms 62 and 64.

Reciprocating mechanism 62 includes, below gear 126, drive shaft 130 mounted through bearing block 132 mounted at frame member 134, shaft 130 being received by gear 126 at one end and by gear 140 at the other end thereof. Gear 140 is a toothed gear for receipt of timing belt, or drive chain, 142 connected at the other end thereof to motor 144 mounted to frame portion 145, preferably a variable speed motor, for thereby driving both reciprocating mechanisms 62 and 64. Control unit 50 may be configured to include a control for adjustment of the speed of motor 144 for thereby enabling timing of the frequency of reciprocal movement of walls 58 and 60. It should be appreciated that a variable speed motor and/or adjustable rods 114 are required only where apparatus 22 is for use in a system which is expected to transfer articles of various sizes, and that motor speed and/or rod length and the choice of the plurality of mounting holes 121 may be fixed where apparatus 22 is for application with a specific article, such as a standard beverage can.

While reciprocating mechanisms 62 and 64 as shown herein, include their own, dedicated, drive motor, it is to be realized that motor 144 could be the same motor, or motors, used to drive transfer surface 16. It should also be realized that other means for causing the expansion and contraction of the staging area could be employed including, for example, separate drive means for each reciprocating mechanism, direct drive mechanisms for the reciprocating mechanisms, directional air jets having varying pressure supplying for effectively allowing expansion and contraction of a predetermined path through the staging area, or a pneumatic system connected directly to the side walls such as a cylinder and shaft arrangement for driving the side walls toward and away from each other, or alternately inflatable and deflatable elongate balloons, one surface thereof forming the side walls. It also is to be understood that, while both of the walls 58 and 60 are preferably movable, only a single movable wall could be provided for reciprocal motion twice the magnitude as set forth herein.

Variable speed motors 146 and 147 are attached to frame 149 to drive transfer surfaces 42 and 44 respectively (by conventional mechanisms, for example gear and chain, or direct drive, mechanisms), essentially providing two conventional endless belt conveyors 150 and 151. Control unit 50 may be provided with controls for adjusting the speed of the two motors to thereby provide flow control as set forth above. Alternately, a single motor with a chain, or timing belt, and gear arrangement may be employed to accomplish variation of the speed of operation of the two transfer surfaces 42 and 44.

As particularly shown in FIG. 3, when movable side walls 58 and 60 are at a position nearest one another, the distance between the side walls is approximately the same as the distance between side rails 80. As the side walls are drawn apart by the reciprocating mechanisms 62 and 64, the staging area is expanded along a line extending between the two side walls.

Figure 5:
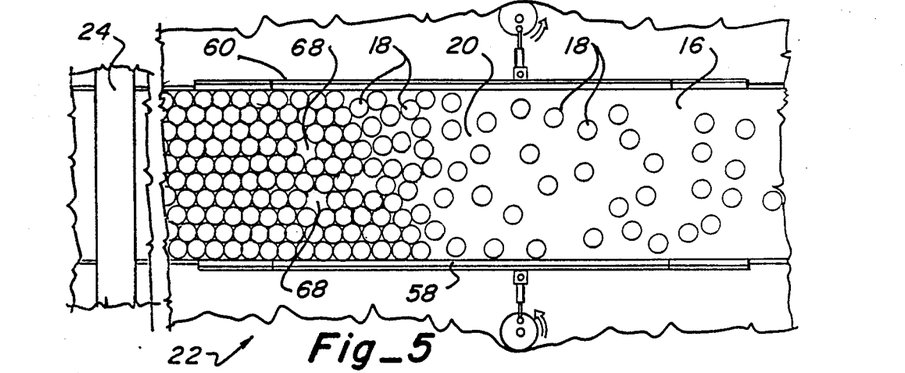
FIGS. 5 through 7 are top views of the apparatus of FIG. 3 illustrating elimination of unoccupied spaces in an assemblage of articles during collection of cylindrical articles to form a palletizable assemblage.
Figure 6:
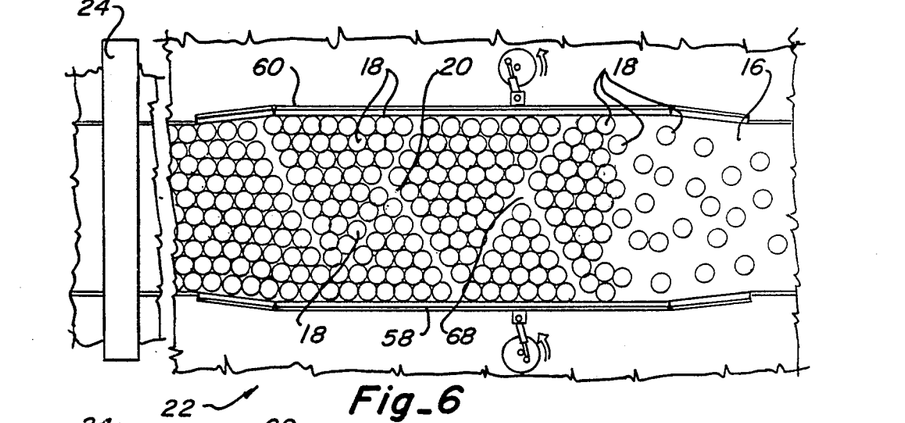
Figure 7:
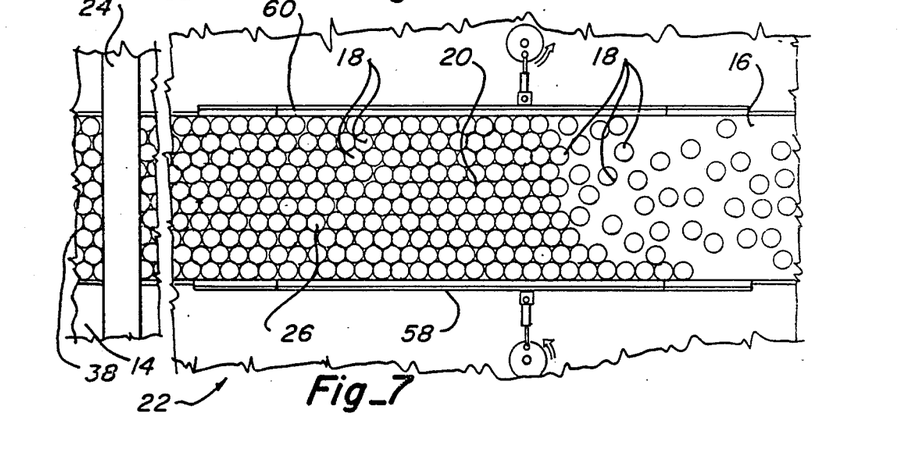

Turning now to FIGS. 5 through 7, operation of apparatus 22 is illustrated. As shown in FIG. 5, with barrier 24 in a down position to impede the movement of articles on the overall transfer surface 16, articles 18 (beverage cans) have begun to accumulate at staging area 20 with voids 68 appearing as the patterned accumulation proceeds. Side walls 58 and 60 are in their inward position (with respect to one another).

In FIG. 6, reciprocating mechanisms 62 and 64 have caused side walls 58 and 60 to move away from one another, thereby expanding staging area 20 along the dimension of the staging area defined by a line between the side walls, and articles have been moved into the space created thereby by the continued movement of overall transfer surface 16. The patterned assemblage is thus caused to be reoriented as the pattern opens, or expands, thereby providing space for articles 18 to occupy voids 68 by movement of the cans 18 on transfer surface 16, with the outward and inward movement of the walls being repeated as collection of the articles proceeds to form the assemblage.

As shown in FIG. 7, all the voids have been filled and barrier 24 has been raised thereby allowing a completed assemblage 26 to be moved to sheet 38 at elevator 14 for palletization of the properly oriented assemblage of articles. Thereafter barrier 24 is lowered and the process repeated.

Figure 8:
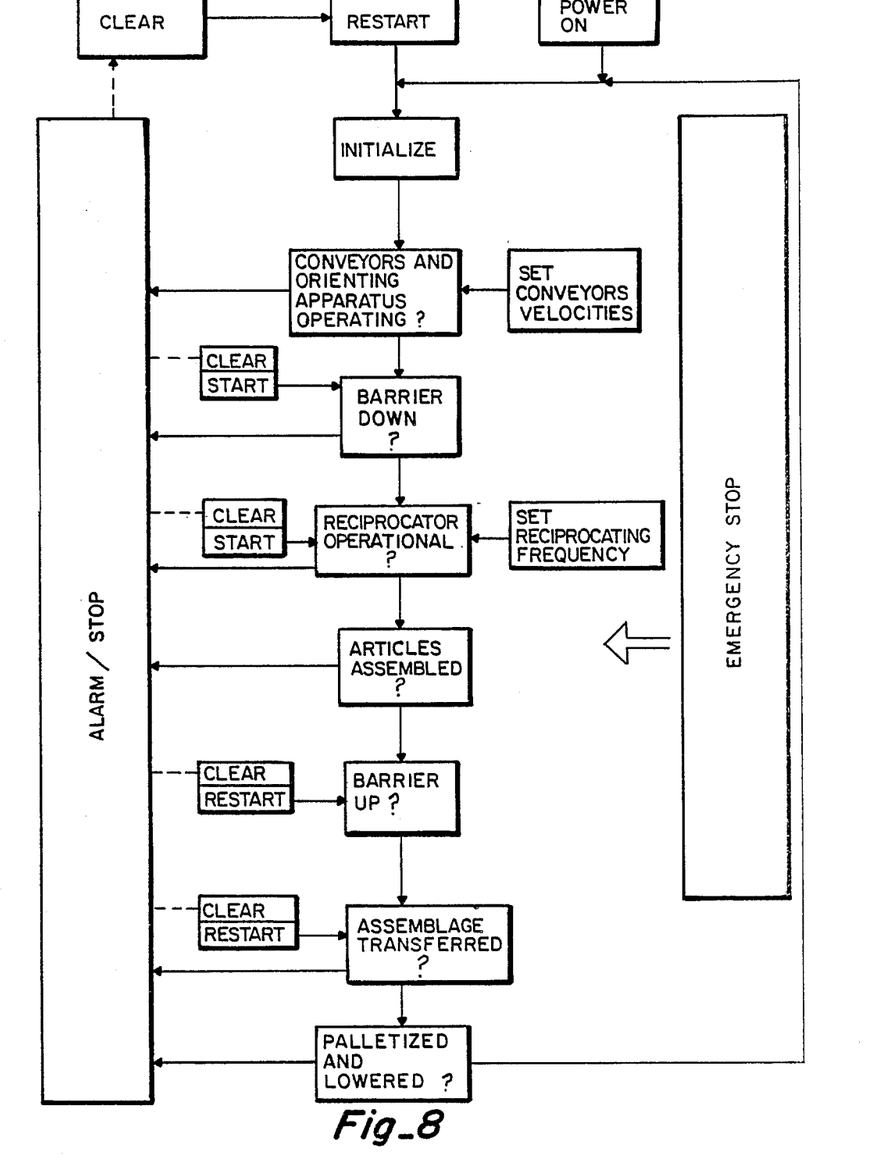
FIG. 8 is a flow diagram illustrative of control unit programming suitable for operational control of the system for formation of cylindrical articles into a palletizable assemblage.

FIG. 8 provides a flow chart illustrating operation of the system for palletization of an assemblage of articles and including the apparatus for promoting a predetermined orientation of articles in an assemblage. As power is supplied to the system, the system is initialized. The system checks to determine whether or not the conveyors and apparatus 22 are operational and if not the system is stopped and an alarm sounded (it should be understood that apparatus 22 may operate either continuously or be provided with controls for limiting the period of reciprocal motion to periods when the barrier is in the down position). The forward and rearward transfer surfaces may have their velocities set to assure proper flow of articles through the system. Thereafter the system checks to determine whether or not barrier 24 is in its down position. If down, and if the reciprocating mechanisms are operational, the operation continues until the articles are sensed to be assembled.

The frequency of the oscillator may be set to achieve proper spacing for variously shaped and sized articles. In addition, the reciprocator frequency may be adjusted mechanically, as described with reference to FIG. 3, by replacement of pin 110 on wheel 108 in one of the variety of mounting positions along the radius of the wheel provided therefore. When the articles have been assembled, the barrier is raised and an assemblage of articles is transferred for palletization, the palletized load is lowered and the process repeated.

An operator may stop the system at any stage using an emergency stop mechanism on the controls. In addition if, at any stage, noncompletion of a step is sensed, the system is stopped and an alarm sounded, whereupon the problem can be cleared and the mechanism restarted at the stage where stopped, if appropriate, or cleared and restarted at another, appropriate stage of operations.

While not specifically shown herein, mechanisms for sensing the completion of the different operational steps are well known, including, for example, limit switches, photoelectric sensing, and the like.

As may be appreciated, a system for palletization of articles including an apparatus and method for promoting predetermined article orientation in an assemblage of articles is provided for herein, which includes side walls positioned adjacent opposite sides of a transfer surface thereby defining a staging, or collection area, with the side walls being connected to mechanisms for imparting reciprocal motion to the side walls to thereby expand and contract the staging area in a manner sufficient to promote occupation of unoccupied spaces in the assemblage of articles. Elevator 14, endless belt conveyors 150 and 151, and barrier mechanism 24 all may be of conventional designs as are currently known in the art, it being necessary only to configure the relationship of the above elements to provide a staging area for deployment of apparatus 22 for promoting proper orientation of articles 18.

What is claimed is:

1. An apparatus for promoting preselected article orientation in an assemblage of articles, said assemblage extending longitudinally and transversely contiguous to a reference surface at a staging area having said reference surface thereat, said apparatus including means for urging said articles through a predetermined path having a plurality of segments in a first direction while at said staging area, and said articles having a first surface contiguous to said reference surface during movement through said predetermined path, said apparatus comprising:

pressure exerting means adjacent to said reference surface and having at least a first portion and a second portion each extending along different segments of said predetermined path for exerting pressure at a surface of at least some of said articles in said assemblage of articles at said staging area other than said first surface, said first and second portions being configured for causing differential article displacement; and pressure varying means connected with said pressure exerting means for repeatedly varying said pressure being exerted at said surface of said articles by said pressure exerting means to thereby cause movement of at least some of said articles while at said staging area in directions angularly oriented with respect to said first direction in a manner sufficient to promote at said staging area said preselected article orientation of said assemblage of articles at said staging area.

2. The apparatus of claim 1 wherein said means for urging said articles through a predetermined path includes conveying means for moving said reference surface through said predetermined path in said first direction, and wherein said pressure exerting means includes wall means adjacent said reference surface and extending substantially in said first direction, said wall means being movable by said pressure varying means in directions angularly oriented with respect to said first direction while said assemblage is being formed at said staging area.

3. The apparatus of claim 2 wherein said articles are cylindrical articles having a diameter, and wherein said wall means are moved by said pressure varying means in an amount no greater than said diameter.

4. The apparatus of claim 2 wherein said wall means includes a padded surface adjacent to said reference surface to protect said articles during said movement of said wall means.

5. The apparatus of claim 1 wherein said apparatus further comprises selectively positionable barrier means for selectively impeding movement of said articles through said predetermined path at said staging area, said movement of said articles through said predetermined path having a component of movement toward said barrier means, so that said assemblage is formed when said barrier means is in a first position and movement of said assemblage of articles from said staging area occurs when said barrier means is in a second position.

6. An apparatus for elimination of unoccupied spaces between articles in an assemblage of articles being gathered at a collection area, said apparatus including conveying means having a transfer surface positioned to enable said articles to be moved through said collection area in a first direction extending between entrance and exit ends of said collection area, said apparatus comprising:
- first and second wall means adjacent said transfer surface and defining opposite sides of said collection area;
- a barrier selectively positionable with respect to said transfer surface for impeding movement of articles on said transfer surface from said exit end of said collection area when in a first position, said barrier being spaced a selected distance downstream in said first direction from said wall means to thereby gather said assemblage when in said first position and to allow movement of said assemblage on said transfer surface when in a second position; and
- control means connected to said wall means for causing repeated substantially simultaneous movement of said first and second wall means in substantially opposite directions to repeatedly expand and then contract a dimension of said collection area so that at least when said barrier is in said first position articles in said assemblage being gathered are caused to occupy previously unoccupied spaces between said articles to thereby enhance article quantity integrity at said collection area.

7. The apparatus of claim 6 wherein said articles are cans having a preselected diameter, and wherein said wall means are moved by said control means to repeatedly alter said dimension of said collection area in an amount no greater than said diameter of said cans.

8. The apparatus of claim 6 wherein said control means includes rotatable means and eccentrically mounted linkage means connected between said rotatable means and said wall means for moving said wall means alternately toward and away from each other, wherein said control means includes drive means connected to said rotatable means to control the movement thereof, and wherein said control means further includes timing means for controlling the frequency of said repeated movement of said wall means relative to one another.

9. The apparatus of claim 8 wherein said drive means is a centralized drive assembly for driving said rotatable means and at least a portion of said conveying means.

10. The apparatus of claim 9 wherein said rotatable means and said eccentrically mounted linkage means include adjustment means for determining the magnitude of movement of said wall means.

11. A system for formation of cylindrical articles into a palletizable assemblage comprising:
- transferring means for urging said articles in a first direction and including a transfer surface and drive means for moving said transfer surface in said first direction, said transfer surface having opposite side portions sufficiently spaced from one another in a direction normal to said first direction so that said transfer surface can receive a plurality of articles thereacross;
- a selectively positionable barrier for impeding movement of articles on said transfer surface in said first direction when in a first position and for allowing movement of an assemblage of such articles on said transfer surface in said first direction when in a second position;
- wall means adjacent to said opposite side portions of said transfer surface and defining opposite sides of a collection area for said articles, said wall means including first, second and third portions, each portion having first and second ends, said first ends of said first and second portions being pivotably connected to one another, said second ends of said second and third portions being pivotably connected to one another, and said second end of said first portion and said first end of said third portion each being pivotably connected at positions adjacent to said transfer surface; and
- reciprocating means connected to said wall means to cause reciprocal movement of said wall means relative to one another so that said collection area is repeatedly, alternately expanded and contracted to thereby promote orientation of said articles into a preselected assemblage at said collection area.

12. The system of claim 11 wherein said transfer surface is provided by the movable belt of a conveyor and said cylindrical articles are cans, and wherein said reciprocating means includes rotatable means and eccentrically mounted linkage means connected between said rotatable means and said wall means so that said wall means are repeatedly, alternately moved toward and away from each other upon rotation of said rotatable means.

13. The system of claim 12 wherein said system further comprises control means for sequentially controlling the operation of said system, and wherein said barrier is positioned at a point spaced from said collection area and is configured to impede article movement without invading the interior of said cans.

14. The system of claim 11 wherein said cans have a preselected diameter, and wherein said movement of said wall means causes expansion and contraction of one dimension of said collection area no greater than said diameter.

15. The system of claim 11 wherein said transfer surface includes a first portion adjacent to said selectively positionable barrier and a second portion adjacent said first portion, and wherein said second portion moves in said first direction at a velocity greater than said first portion, so that said orientation of said articles is promoted when said selectively positionable barrier is in either of said first and said second position.

16. A method for promoting preselected article orientation in an assemblage of articles, said assemblage extending longitudinally and transversely contiguous to a reference surface at a staging area having said reference surface thereat, said staging area being defined at the exit end by movable barrier means, said articles being urged through a predetermined path in a first direction while at said staging area, and said articles having a first surface contiguous to said reference surface during movement through said predetermined path, said method comprising:
- exerting pressure at a surface of at least some of said articles in said assemblage of articles at said staging area other than said first surface, said pressure being directed from positions extending along said predetermined path adjacent to said reference surface;

repeatedly varying said pressure being exerted at said surfae of said articles to thereby cause movement of at least some of said articles while at said staging area in directions angularly oriented with respect to said first direction in a manner sufficient to promote at said staging area said preselected article orientation of said assemblage at said staging area; and moving said assemblage of articles having said preselected article orientation from said staging area past said movable barrier means while continuing to repeatedly vary said pressure.

17. The method of claim 16 further comprising the step of temporarily impeding movement of said articles at said staging area to thereby promote formation of said assemblage.

18. The method of claim 17 wherein the method further comprises the step of ceasing to impede movement of said articles so that said assemblage is moved onto a pallet.

19. The method of claim 16 wherein said articles have a preselected diameter, and wherein said step of repeatedly varying said pressure includes the step of thereby altering at least one dimension of said staging area in an amount no greater than said diameter.

20. A method for causing occupation by articles of unoccupied spaces between articles in an assemblage of articles arranged on a surface in a collection area, said surface having opposite side portions, said opposite side portions having first and second walls each of which are adjacent to a different one of said opposite side portions and which are sufficiently spaced from one another so that said surface has a width defined by the relative positions of said first and second walls sufficient to receive a plurality of articles thereacross, said method comprising:

moving articles on said surface in a first direction extending between entrance and exit ends of said collection area;

impeding movement of said articles on said surface at said exit end of said collection area by blocking article movement at a position spaced a selected distance downstream in said first direction from said walls so that said articles are collected at said collection area between said first and second walls; and repeatedly substantially simultaneously moving said first and second walls in substantially opposite directions to thereby alternately expand and then contract said width of said surface in said collection area while continuing to move said surface in said first direction to thereby cause articles to occupy unoccupied spaces in said assemblage of articles.

21. The method of claim 20 wherein said first and second walls extend in said first direction and wherein said method further comprises the step of resuming movement of said assemblage of articles on said moving surface after said unoccupied spaces have been occupied while continuing to repeatedly move said first and second walls.

22. The method of claim 20 wherein said articles are cans, and wherein said method further comprises the step of allowing cans to move into said unoccupied spaces on said surface during expansion of said collection area.

23. The method of claim 22 wherein said step of repeatedly, alternately expanding and contracting said collection area includes the step of providing protection against damage of said articles during said contraction of said collection area.

24. The method of claim 20 wherein said articles are cans and said assemblage of articles arranged on said surface is a patterned assemblage, and wherein the step of impeding movement of said articles on said moving surface so that said articles are collected at said collection area includes the step of forming said patterns, and wherein the step of repeatedly, alternately expanding and contracting said collection area includes the step of shifting said can patterns during formation thereof.

* * * * *

UNITED STATES PATENT AND TRADEMARK OFFICE
CERTIFICATE OF CORRECTION

PATENT NO. : 4,934,508
DATED : June 19, 1990
INVENTOR(S) : Vander Meer et al.

It is certified that error appears in the above-identified patent and that said Letters Patent is hereby corrected as shown below:

Column 3, line 67, "to" should be --of--.

Column 4, line 59, "1 1/4" should be --2 1/4--.

Column 11, line 2, "surfae" should be --surface--.

Signed and Sealed this

Twenty-seventh Day of August, 1991

Attest:

HARRY F. MANBECK, JR.

*Attesting Officer*  *Commissioner of Patents and Trademarks*